United States Patent
Müller et al.

(10) Patent No.: US 8,780,866 B2
(45) Date of Patent: Jul. 15, 2014

(54) CONTROLLING NODE

(75) Inventors: Walter Müller, Upplands Väsby (SE); Zhiyi Xuan, Täby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 850 days.

(21) Appl. No.: 12/728,887

(22) Filed: Mar. 22, 2010

(65) Prior Publication Data

US 2011/0002307 A1 Jan. 6, 2011

Related U.S. Application Data

(60) Provisional application No. 61/223,215, filed on Jul. 6, 2009.

(51) Int. Cl.
*H04W 24/00* (2009.01)

(52) U.S. Cl.
USPC .......................................... 370/332

(58) Field of Classification Search
USPC .................................. 370/328–338
See application file for complete search history.

(56) References Cited

U.S. PATENT DOCUMENTS

| | | | |
|---|---|---|---|
| 6,131,030 A | 10/2000 | Schön et al. | |
| 6,330,449 B1 * | 12/2001 | Kim | 455/442 |
| 7,894,410 B2 * | 2/2011 | Zhou et al. | 370/338 |
| 8,169,967 B2 * | 5/2012 | Lee et al. | 370/331 |
| 2002/0086692 A1 * | 7/2002 | Chheda et al. | 455/522 |
| 2004/0147264 A1 * | 7/2004 | Ogawa | 455/441 |
| 2007/0153676 A1 * | 7/2007 | Baglin et al. | 370/216 |
| 2008/0240043 A1 | 10/2008 | Lee et al. | |
| 2010/0004001 A1 * | 1/2010 | Tao et al. | 455/456.1 |
| 2010/0027507 A1 * | 2/2010 | Li et al. | 370/331 |
| 2010/0027510 A1 * | 2/2010 | Balasubramanian et al. | 370/332 |
| 2010/0067484 A1 * | 3/2010 | Kagimoto et al. | 370/331 |
| 2010/0226339 A1 * | 9/2010 | Stephenson et al. | 370/332 |

(Continued)

FOREIGN PATENT DOCUMENTS

| | | |
|---|---|---|
| CN | 101312599 A | 11/2008 |
| CN | 101453763 A | 6/2009 |

(Continued)

OTHER PUBLICATIONS

Swedish Patent Office, Int'l Search Report in PCT/SE2009/051348, Aug. 2, 2010.

(Continued)

*Primary Examiner* — Hassan Phillips
*Assistant Examiner* — Omeed D Rahgozar
(74) *Attorney, Agent, or Firm* — Coats and Bennett, P.L.L.C.

(57) ABSTRACT

A controlling node for a cellular communications system, arranged to handle the control of one or more user terminals in a first cell and configurable to receive transmissions from one or more user terminals in the first cell, with a defined periodicity. The controlling node includes a receipt monitor for one or more users in the cell, the receipt monitor being arranged to monitor timely receipt of the one or more of the certain transmissions from the one or more user terminals at the expected time for the defined periodicity, and to initiate handover of a user terminal from the first cell to another cell if the controlling node does not receive one or more of the certain transmissions at the expected time for the defined periodicity from the user terminal.

26 Claims, 5 Drawing Sheets

(56) References Cited

U.S. PATENT DOCUMENTS

| | | | |
|---|---|---|---|
| 2010/0272066 A1* | 10/2010 | Wang et al. | 370/331 |
| 2010/0278143 A1* | 11/2010 | Chun et al. | 370/331 |
| 2011/0009116 A1* | 1/2011 | Moberg et al. | 455/425 |
| 2011/0310852 A1* | 12/2011 | Dimou et al. | 370/332 |
| 2012/0009928 A1* | 1/2012 | Wu et al. | 455/436 |
| 2012/0100861 A1* | 4/2012 | Zhang et al. | 455/444 |

FOREIGN PATENT DOCUMENTS

| | | | |
|---|---|---|---|
| RU | 2249917 C2 | 4/2005 | |
| WO | 2006/104726 A1 | 10/2006 | |
| WO | 2008/157717 A1 | 12/2008 | |
| WO | 2008/157800 A1 | 12/2008 | |

OTHER PUBLICATIONS

Swedish Patent Office, Written Opinion in PCT/SE2009/051348, Aug. 2, 2010.

WIPO, Int'l Prelim. Report on Patentability in PCT/SE2009/051348, Jan. 10, 2012.

* cited by examiner

CONTROLLING NODE

This application claims the benefit of the filing date of U.S. Provisional Patent Application No. 61/223,215 filed on Jul. 6, 2009, which is incorporated here by reference.

TECHNICAL FIELD

This invention relates to an improved controlling node for a cellular communications system and a method for use in such a node.

BACKGROUND

In a cellular communication system such as the Long Term Evolution (LTE) system, a user equipment (UE), such as a mobile telephone, wireless card, etc., measures the signal strength and/or signal quality of the signals from its serving cell and a number of neighboring cells. The Third Generation Partnership Project (3GPP) issues specifications, or standards, that define an LTE and other communication systems.

The results of the measurements are sent by the UE to the controlling node, the eNodeB, of the serving cell, when and if the measurements fulfill certain criteria that are set by the eNodeB, so called "event criteria", or with a periodicity that is defined by the eNodeB.

The results of the measurements are used by the eNodeB to decide when and if a handover of the UE to another cell should be initiated.

SUMMARY

Embodiments of this invention provide a controlling node for a cellular communication system which has improved properties with regard to handover functionality as compared to previous such controlling nodes.

According to an aspect of this invention, a controlling node for a cellular communications system includes a transmit unit, a receive unit, a processing unit, and a memory unit, as well as an interface for an antenna, which units and interface enable the controlling node to communicate with and handle the control of one or more user equipments (UEs) in a first cell. A controlling node according to the invention is arranged to receive, via the antenna interface and the receive unit, certain transmissions from one or more user equipments in the first cell with a defined periodicity.

The controlling node also includes a receipt monitor for one or more UEs in the cell. The receipt monitor is arranged to monitor timely receipt of the one or more of the certain transmissions from the one or more UEs at the expected time for the defined periodicity, and to initiate handover of a UE from the first cell to another cell if the controlling node does not receive one or more of the certain transmissions at the expected time for the defined periodicity from the UE.

According to an aspect of the invention, a method for a controlling node of a cellular communication system includes letting the controlling node receive certain transmissions from one or more user terminals in a first cell with a defined periodicity; monitoring, in the controlling node, whether the controlling node receives the certain transmissions from the one or more user terminals at an expected time for the defined periodicity; and initiating handover from the first cell to another cell of a user terminal for which the certain transmissions are not received at the expected time.

In an embodiment of the invention, the "certain transmissions" include one or more of the following:
scheduling requests,
measurement reports containing measurements on the first cell and/or one or more other cells in the system,
buffer status reports,
channel quality indicator transmissions,
random access requests, and
data transmissions.

In an embodiment, the controlling node includes a handling function for one or more UEs in the cell, and the handling function checks if the one or more of the certain transmissions has been received at the expected time, and initiates the handover if this is not the case.

In an embodiment, the controlling node is arranged to instruct one or more UEs regarding the defined periodicity with which the certain transmissions should be transmitted.

In an embodiment, the controlling node is arranged to instruct a UE to start the transmissions with the defined periodicity after the UE has detected and reported to the controlling node that the criteria for a system defined event have been fulfilled.

In an embodiment, the controlling node is arranged to instruct a user equipment to start the certain transmissions with the defined periodicity as long as the UE detects that the criteria for a system defined event are fulfilled, in so-called event-triggered periodic reporting.

In various embodiments, the controlling node of the invention is arranged to perform the handover to a second cell, a "target cell", of different kinds, as long as the user equipment has measured a signal strength from the target cell which differs from the signal strength of the first cell, the "serving cell", by a certain margin for a certain amount of time. Examples of different kinds of such "target cells" are:
a target cell which operates on the same frequency as the first cell, from which second cell the UE has measured a signal strength which differs from the signal strength from the first cell by a certain margin for a certain amount of time; and
a target cell which operates on a frequency different from the first cell, from which second cell the UE has measured a signal strength which differs from the signal strength from the first cell by a certain margin for a certain amount of time.

In an embodiment, the controlling node performs the handover to a cell in a second cellular system which is of a different standard than that of the serving cell.

BRIEF DESCRIPTION OF THE DRAWINGS

The invention is described in more detail in the following, with reference to the appended drawings, in which.

DETAILED DESCRIPTION

The invention and a system in which the invention is applied will be described in detail in the following, using terminology from the LTE/E-UTRAN system. However, it should be emphasized that this terminology is used in order to facilitate the reader's understanding of the invention, and should not be used to limit the scope of protection sought for nor given to the present invention, the principles of which can be applied in a variety of other cellular systems, such as for example, systems of the wideband code division multiple access (WCDMA) kind.

Figure 1:
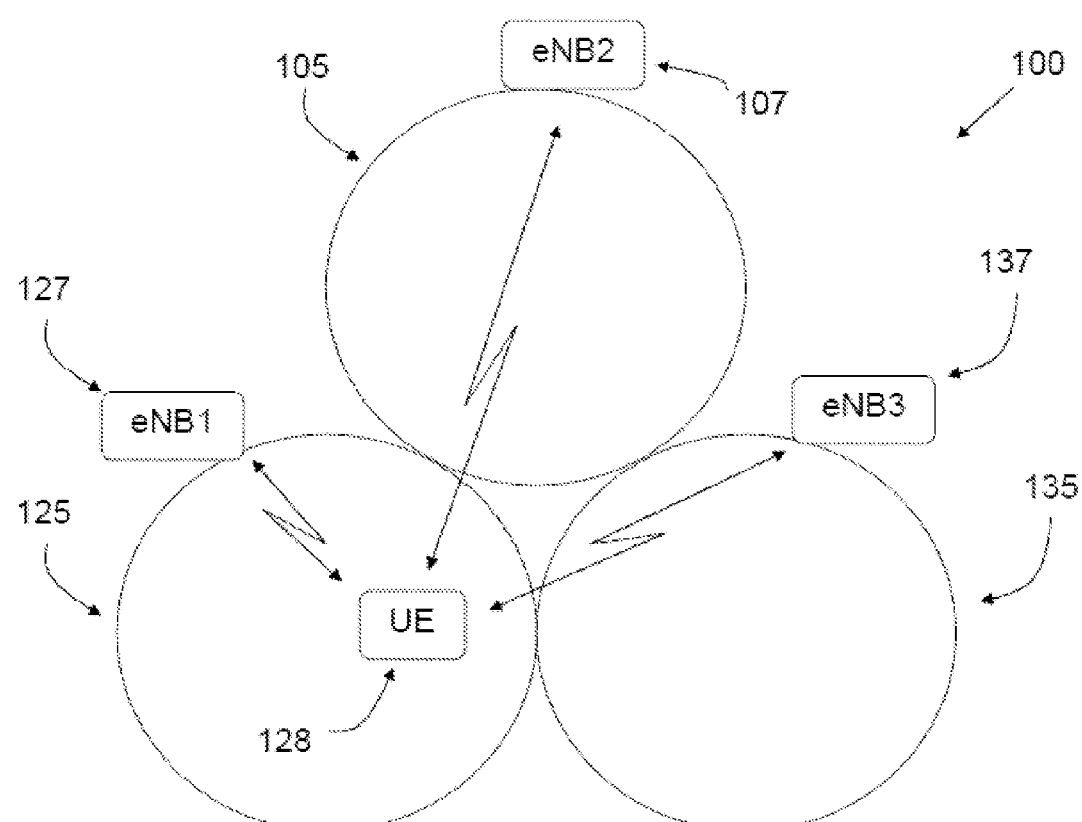
FIG. 1 shows a schematic overview of a system in which the invention is applied.

An example of a system 100 in which the invention can be applied is shown in FIG. 1. As shown, the system 100 comprises a number of cells, of which three, 105, 125, 135, are shown as examples. Each cell can accommodate one or more user terminals, UEs, one of which is shown as 128 in the cell 125.

For each cell, there is a controlling node, a so-called eNodeB. One role of the eNodeB is that all traffic to and from the UEs in a cell is routed via the eNodeB of the cell; another role of the eNodeB of a cell is to administer the UEs in the cell.

In the example of FIG. 1, the UE 128 is in the cell 125 which is controlled by the eNodeB (eNB) 127. The UE 128 is configured by "its" eNodeB, i.e., the eNodeB 127, to make certain transmissions with a certain periodicity. The certain transmissions can be of various kinds, but in general, examples of such transmissions are:

scheduling requests,
measurement reports containing measurements on the first cell (cell 125) and/or one or more other cells in the system,
buffer status reports,
channel quality indicator transmissions,
random access requests, and
data transmissions for which the UE has requested grant and the eNodeB has granted the request.

Naturally, the eNodeB can configure the UE to use different time periods for the different kinds of transmissions. In addition, the periodic transmissions can be of different kinds, such as, for example, the following:

a periodic transmission which goes on indefinitely, and
a periodic transmission which goes on until a defined number of transmissions has been made.

A sub-case of the latter kind of transmission is a periodic transmission where the defined number is one. This can, for example, be the case with data transmissions, which can also be seen as transmissions in a periodic series with the length "1", i.e., there will be only one transmission expected at one point in time.

The invention will be described below with the use of measurement reports and scheduling requests as examples of the "certain transmissions", but it will be understood that this is merely by way of example and that the principles described below can be applied to any of a large variety of transmissions, including those enumerated above.

It will also be understood that a measurement report will usually be preceded by a scheduling request, unless so-called "semi-persistent scheduling" is used. For that reason, the description below uses the term "measurement report" as a generic term which refers to both cases, i.e., measurement reports transmitted on their own and measurement reports preceded by scheduling requests.

Returning now to the example of FIG. 1, as indicated by the arrows in FIG. 1, the UE 128 receives signals from the controlling node, the eNodeB, of the cell 125 as well as from the eNodeBs of the neighboring cells 105, 135. The UE measures the strength of the signals received from both the eNodeB of the serving cell 125 and from the eNodeBs of the neighboring cells 105, 135, and is configured by its serving cell eNodeB, i.e., the eNodeB 128, to transmit, with a certain periodicity, measurement reports containing the results of these measurements to the serving cell eNodeB 128.

The measurements which are performed by the UE aim to establish the strength or the quality of the signals from the cells, i.e., the "Reference Symbol Received Power" (RSRP), or the "Reference Symbol Received Quality" (RSRQ), which in turn is done in order to see if the UE should be "handed over" to another cell, and thus have another serving cell.

The signal strength or quality that is measured is usually that of predefined channels or symbols, e.g., "Reference Symbols" (RS), which an eNodeB transmits in its cell.

Figure 2:
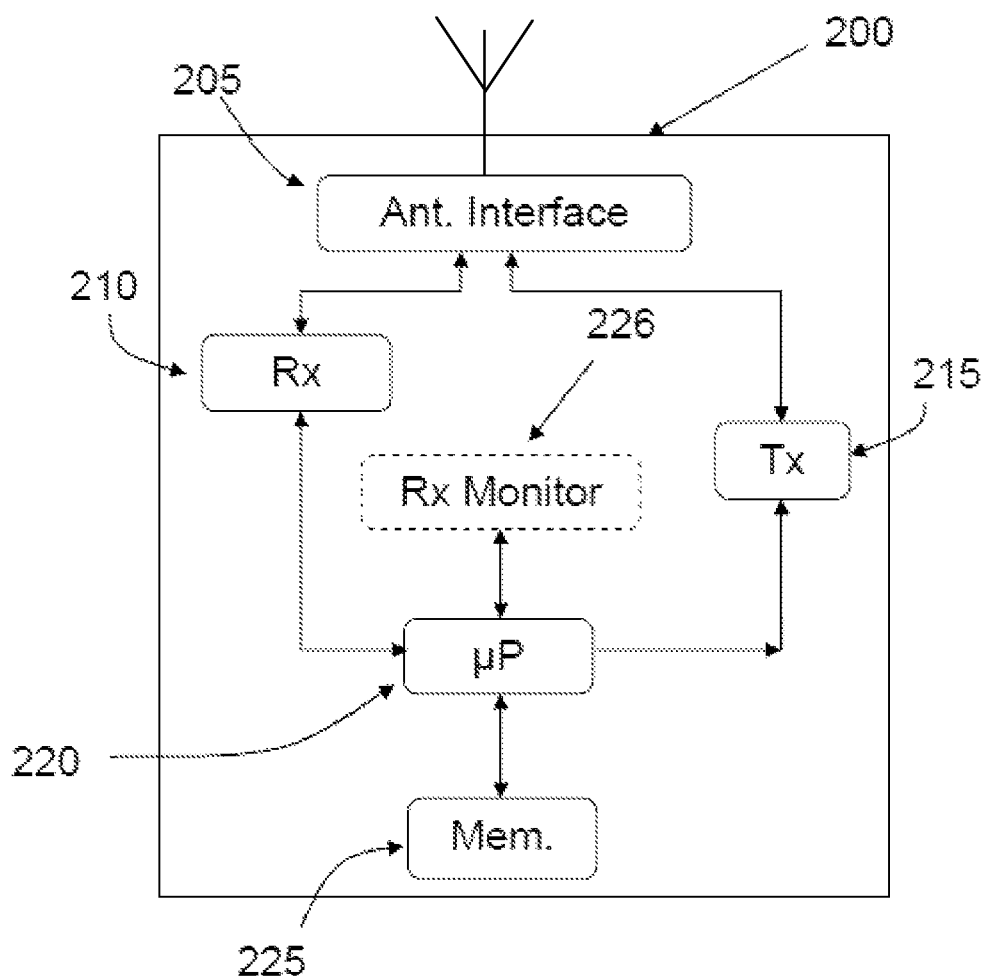
FIG. 2 shows a schematic block diagram of a controlling node in accordance with the invention.

As stated above, a purpose of the invention is to provide a controlling node with enhanced facilities for handling transmissions such as measurement reports from a UE, e.g., to improve the handover function. FIG. 2 shows a schematic block diagram of a controlling node 200 in accordance with the invention: the controlling node 200 comprises an antenna interface 205 for an antenna, so that such a unit may be connected to the controlling node 200, and also comprises a receive (Rx) unit 210 and a transmit (Tx) unit 215. The antenna is indicated as a single antenna merely for simplicity; suitable multiple antennas can be provided. The antenna interface 205 is suitably both a transmit and a receive antenna unit, so that the Rx and Tx units 210, 215, are both connected to the antenna via the antenna interface 205.

The Rx and Tx units 210, 215, are controlled by a processing unit 220, which can also be seen as a control unit, and the processing unit is connected to a memory unit 225 which is used for, for example, storage of information. In FIG. 2, the processing unit 220 is shown as "µP", in order to indicate that this unit suitably comprises one or more microprocessors. This should naturally only be seen as an example, other kinds of processing units or control units are also perfectly possible within the scope of the present invention.

The antenna interface unit 205, the transmit unit 215, the receive unit 210, the processing unit 220 and the memory unit 225 enable the controlling node 200 to communicate with and handle the control of one or more user terminals in a cell such as the cell 125 in the system 100.

As mentioned, the controlling node 200 is arranged to receive, via the antenna interface unit 205 and the Rx unit 210, from one or more user terminals in a cell, with a certain periodicity, transmissions such as scheduling requests and/or measurement reports containing measurements on the cell and/or one or more other cells in the system.

According to the invention, the processing unit 220 is arranged to initiate handover of a user terminal from the cell in which the user terminal is located to another cell if the controlling node does not receive a transmission at the expected time from the user terminal. The term "expected time" here refers to the time according to a certain configured periodicity, which has been configured in the user terminal, the UE, by the eNodeB.

In one embodiment, the processing unit 220 comprises a receipt monitor 226 for one or more user terminals in the cell for which the eNodeB 200 is the serving cell eNodeB, and the receipt monitor checks if the measurement report(s) for one or more user terminals has been received at the expected time, and initiates a handover if this is not the case.

The receipt monitor 226 is shown as a separate unit in FIG. 2, but can of course also, as an alternative, be integrated in one of the other units in the controlling node 200, such as for example in the processing unit 220. In addition, the receipt monitor 226 can be designed in hardware or software, or in a combination of hardware or software. Thus, if the receipt monitor is integrated with, for example, the processing unit 220, the receipt monitor can be either software which is executed in the processing unit 220, or, if designed as a separate unit, the receipt monitor 226 can be designed as software in a separate processor which interfaces with the processing unit 220.

The processing unit 220 is suitably arranged to instruct, via the Tx unit 215 and the antenna interface unit 205, one or more user terminals regarding the periodicity with which the user terminal's "measurement reports" (MRs) should be transmitted to the eNodeB 200.

The periodicity of the MRs from a UE can be defined by the controlling node of the invention in a number of ways, including the following:

periodic reporting—the controlling node instructs the UE to transmit MRs with a certain periodicity;

periodic reporting triggered by system events—two versions are possible:

the controlling node orders the UE to start transmitting MRs with a certain periodicity after the UE has detected and reported to the controlling node that the criteria for a system defined "event" have been fulfilled; and the controlling node orders the UE to start transmitting MRs with a certain periodicity while the UE detects that the criteria for a system defined "event" is fulfilled, i.e., so-called event-triggered periodic reporting.

The events which are mentioned above can be of a variety of different kinds, depending on, for example, the kind of system in which the invention is applied. However, with continued use of an LTE system as an example, the following LTE events can be mentioned as examples of events for use in the invention:

A2—the signal of the serving cell becomes worse than a certain threshold;

A3—the signal of a neighbor cell becomes "offset better" than the signal of the serving cell; the offset can be ether negative or positive, so that the A3 event can, in the case of a negative offset, be triggered when the signal strength from a neighboring cell is x dBm below that of the serving cell;

A4—the signal of a neighbor cell becomes better than a certain threshold;

A5—the signal of the serving cell becomes worse than a first threshold and a neighbor cell becomes better than a second threshold;

B1—the signal of an Inter Radio Access Technology (IRAT) neighbor becomes better than threshold; and B2—the serving cell becomes worse than threshold 1 and an IRAT neighbor cell becomes better than threshold.

As has been mentioned, an eNodeB according to the invention initiates handover of a UE if the eNodeB does not receive a transmission, e.g., a scheduling request (SR) and/or MR, from the UE at the expected time for the periodicity with which the eNodeB has ordered the UE to transmit the information, e.g., SR and/or MR. The periodicity can be of various kinds, as explained above, but the invention will be exemplified with reference to FIGS. 3 and 4, in which periodic reporting triggered by system event A3 is used. However, it should be understood that both the event and the type of periodic reporting as well as the type of transmission are examples only.

Figure 3:
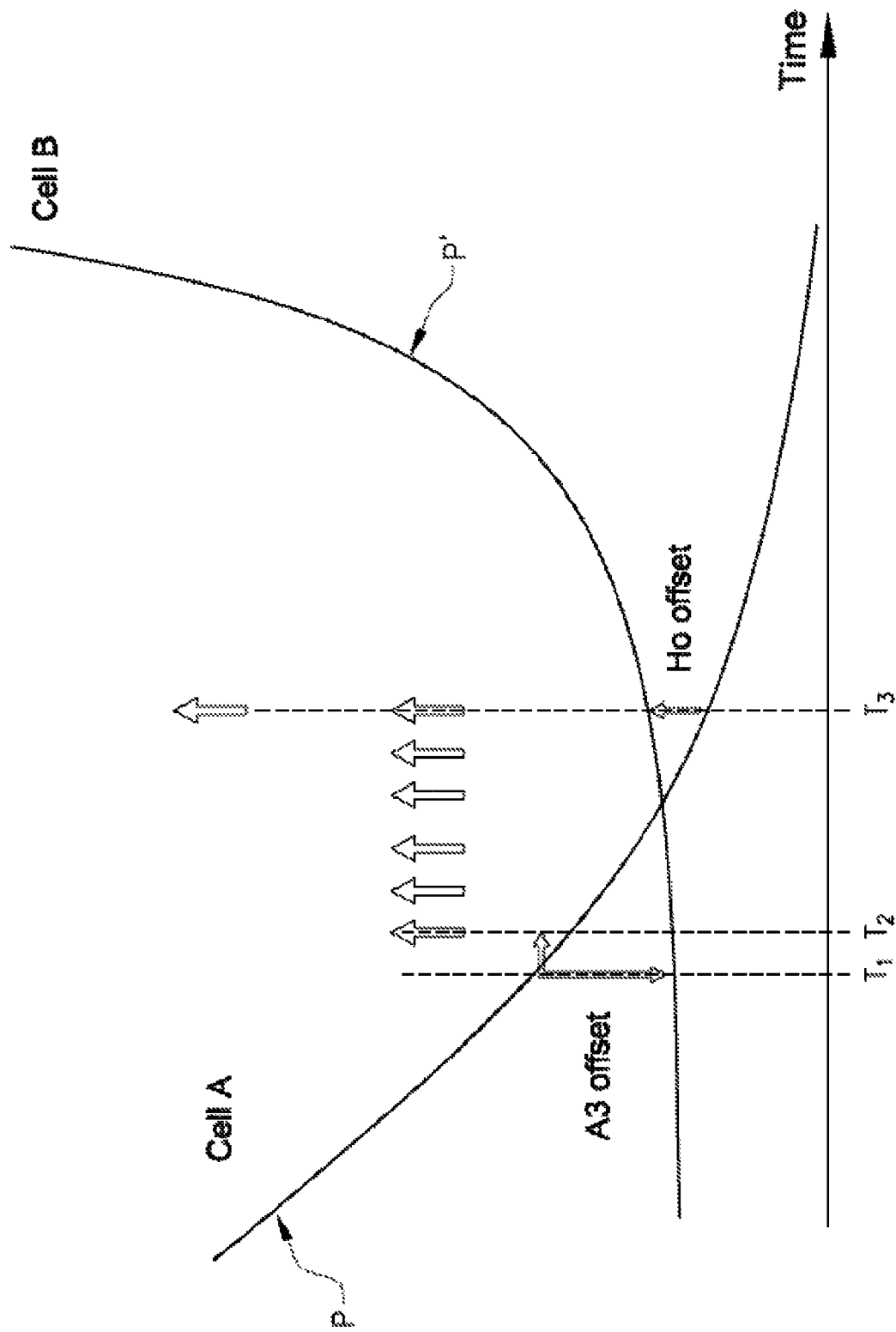
FIGS. 3 and 4 show applications of the invention.

In FIG. 3, a case is shown in which a UE measures the received power P from its serving cell, shown as cell A in FIG. 3, as well as the received power P' from a neighboring cell, shown as cell B in FIG. 3. At time T1, the criteria for an A3 event are fulfilled. As shown in FIG. 3, the criteria is here that the signal from cell B is within a certain offset from that of cell A, a so-called A3 offset.

The detection of the A3 event causes the UE to report the A3 event to its eNodeB, i.e., the eNodeB of cell A, following which the eNodeB instructs the UE to commence periodic reporting (transmission of MRs) with a certain periodicity. The transmission of MRs to the eNodeB of cell A commences at the time shown as T2 in FIG. 3, and then continues with the instructed periodicity, as shown by the arrows. At the time shown as T3, the received signal strength at the UE from cell A drops below the received signal strength at the UE from the neighboring cell B by a certain amount, a defined handover offset, "Ho offset", at which point in time the eNodeB of cell A initiates a handover of the UE to the eNodeB of cell B.

Figure 4:
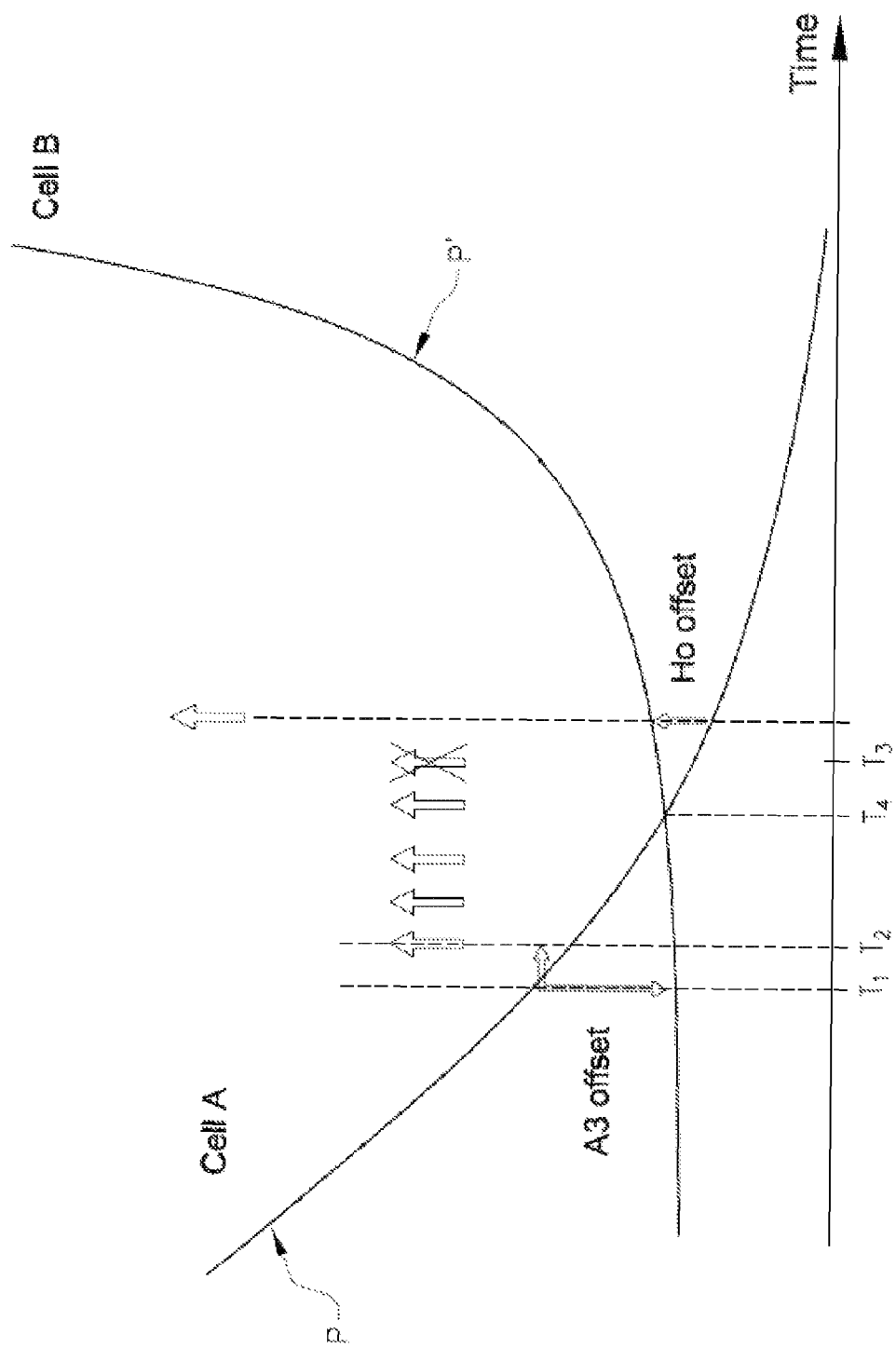

FIG. 4 shows a case which initially is similar to that of the one in FIG. 3, and which will thus not be described from the beginning again. The reference letters and numbers from FIG. 3 have also been used in FIG. 4. However, in the case shown in FIG. 4, as opposed to that of FIG. 3, at time T3 no measurement report is received by the serving cell eNodeB, although T3 is the expected time for receipt of such a measurement report for the periodicity with which the UE has been instructed to transmit measurement reports.

According to the invention, since the eNodeB does not receive the measurement report at the expected time, the eNodeB initiates handover of the UE. This is due to the fact that since the measurement report is not received at the expected time, this is seen by the eNodeB as a sign that the uplink from the UE to the eNodeB has deteriorated so much that uplink communication is impossible for that UE, for which reason it is better to hand the UE over to another eNodeB.

Which cell that the UE with the missing measurement report or scheduling request should be handed over to can vary within the scope of the invention. In the example shown in FIG. 4, the choice may seem straightforward: the handover should be to cell B, i.e., to the neighboring cell whose signals have exceeded that of cell A since the time shown as T4 in FIG. 4. However, a number of different principles for handover are possible, depending on the situation.

Examples of different handover principles within the scope of the invention include the following.

The handover is performed to a second cell in the system, which operates on the same frequency as the first cell, from which second cell the user terminal has measured a signal strength which differs from the signal strength from the first cell by a certain margin for a certain amount of time. This is substantially the case shown in FIG. 4, since the signal strength from cell B has exceeded that from call A from time T4. However, it should be pointed out that "differ" can also mean that the signal strength from the other cell has been below that of the serving cell, although by a defined margin or offset.

The handover is performed to a second cell in the system, which operates on a frequency different from that of the serving cell, from which second cell the user terminal has measured a signal strength which differs from the signal strength from the first cell by a certain margin for a certain amount of time. However, it should be pointed out that "differ" can also mean that the signal strength from the other cell has been below that of the serving cell, although by a defined margin or offset.

The handover is performed to a cell in a second cellular system of a different standard than that of the first cell. For example, if the system in which the UE of FIGS. 3 and 4 operates is a system compliant with the LTE standard, the handover is performed to a cell of, for example, any of the systems UTRA, GERAN, or CDMA 2000, on which the UE has been ordered by its eNodeB to perform measurements.

The handover is performed to a second cell in the system on which second cell the user terminal has not performed any measurements. Suitably, the second cell is on a frequency different from that of the first cell. This is a so-called "blind handover", since no measurements have been performed.

However, the serving cell eNodeB may have knowledge of this cell from other sources, e.g., from higher-level nodes in the system.

In one embodiment of the invention, the controlling node is arranged to initiate handover in the case of a non-received measurement report if the measurement report is not received within a certain interval of the expected time. Thus, with reference to FIG. 4, this would mean that there is a certain "window" around the time T3 within which the measurement report can be received before handover is initiated.

Also, in one embodiment of the invention, the controlling node is arranged to initiate handover in the case of a pre-defined number of missing measurement reports, such as two missing reports. Suitably, but not necessarily, such missing measurement reports need to be consecutive in order for the handover to be initiated.

Regarding the invention's use of the criteria for LTE events A2, A3, A4, and A5, from here on referred to as Ax, where x in an integer [2 ... 5], in one embodiment of the invention, the controlling node uses the principles of event Ax, although the exact criteria for that event are varied. This is due to the fact that originally, event Ax is used to trigger a handover, which is slightly different from the manner in which event Ax is used by the controlling node of the invention, which in this embodiment uses event Ax with a variation of the criteria for the event so as to enable the eNodeB to obtain more information about what is happening with the UE, in order to enable a handover in the event of an uplink failure.

As an example, the criteria for the LTE event A3 can be varied in that the offset parameter Off, i.e., the A3 offset shown in FIGS. 3 and 4, is lowered (i.e., decreased) by x dB as compared to the conventional (system-specified) Off parameter. This is done so that the A3 event will be triggered earlier than in those applications where A3 is used for a "straightforward" handover. The invention's variation of the A3 criteria can be varied, but a suitable value is to set the A3 criteria so that the A3 event is triggered when the signal from a neighboring cell is 3 dB below that of the "serving cell". This is different from conventional A3 criteria, according to which an A3 event is triggered, for example, when the signal from another cell is 2-3 dB above that of the serving cell.

A typical reporting interval configured by the eNodeB in accordance with the invention is 1-2 times per second.

As has been mentioned, a controlling node according to the invention can be a controlling node for a number of different systems. In one embodiment, the controlling node is an eNodeB for an LTE/E-UTRAN system, and in another embodiment, the controlling node is a NodeB for a WCDMA system. Naturally, one and the same physical unit or units can co-house two or more controlling nodes in accordance with the invention, which are for the same or different systems.

Figure 5:
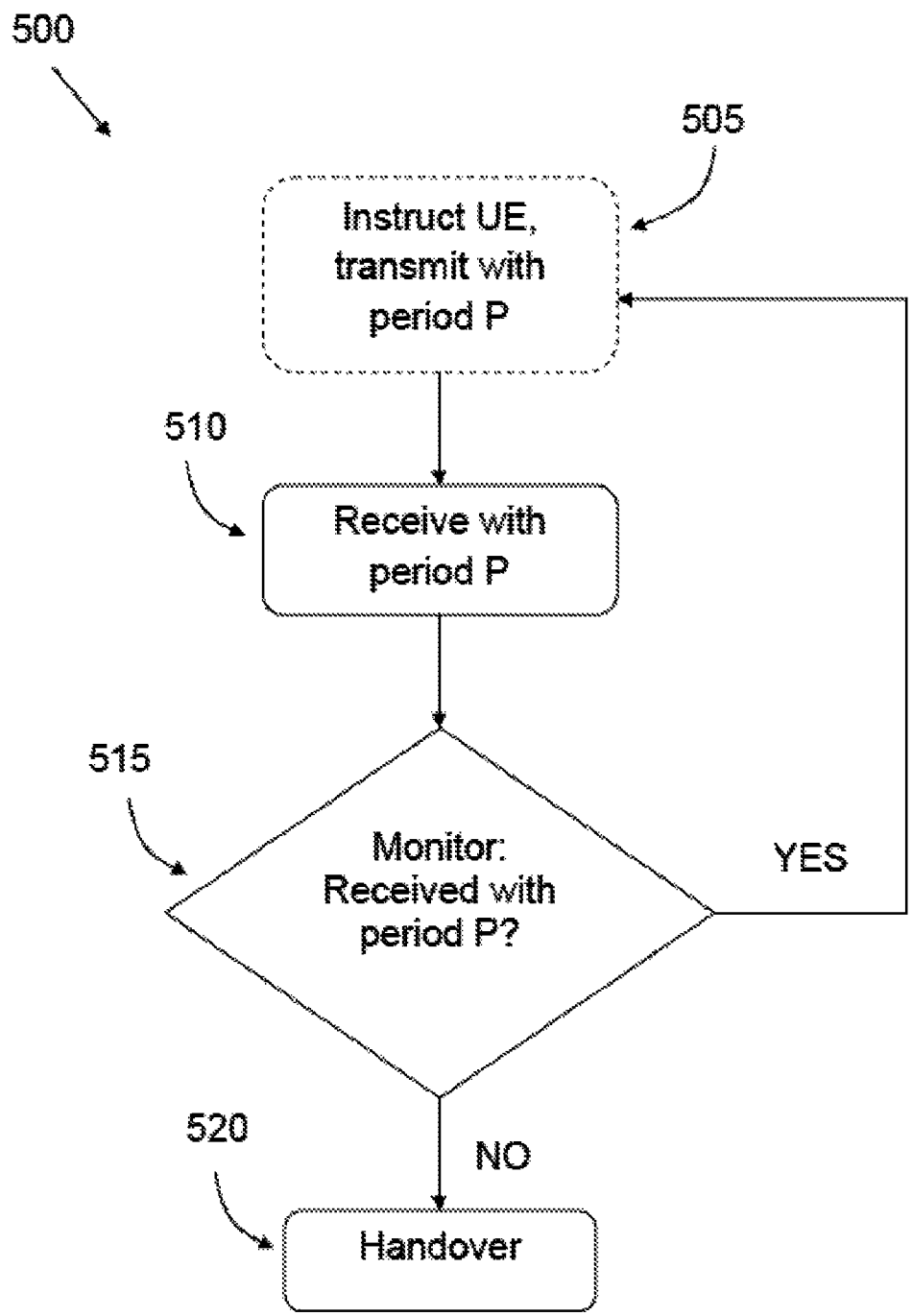
FIG. 5 shows a flowchart of a method in accordance with the invention.

FIG. 5 shows a flow chart of a method 500 in accordance with the invention. Steps which are options or alternatives are shown in dashed lines in FIG. 5.

As has also emerged from the previous explanation, the method 500 is intended for use in a controlling node of a cellular communications system, and comprises, step 510, letting the controlling node receive certain transmissions from one or more user terminals in a first cell with a defined periodicity P.

The method 500 comprises monitoring, step 515, if the controlling node receives the certain transmissions from the one or more user terminals at the expected time for the defined periodicity, and to initiate, step 520, handover from the first cell to another cell of a user terminal for which this is not the case.

In one embodiment, the method 500 includes that the certain transmissions include one or more of the following:
scheduling requests,
measurement reports containing measurements on the first cell and/or one or more other cells in the system,
buffer status reports,
channel quality indicator transmissions,
random access requests, and
data transmissions.

In one embodiment, the method 500 includes that a handling function in the controlling node handles one or more user terminals, and the handling function checks if the transmissions have been received at the expected time, and initiates the handover if this is not the case.

In one embodiment, the method 500 includes that the controlling node instructs, step 505, a user terminal regarding the periodicity P with which the user terminal's the certain transmissions should be transmitted to the controlling node.

In one embodiment, the method 500 includes that the controlling node instructs a user terminal to start the transmissions with the periodicity after the user terminal has detected and reported to the controlling node that the criteria for a system defined event have been fulfilled.

In one embodiment, the method 500 includes that the controlling node instructs a user terminal to start the transmissions with the periodicity as long as the user terminal detects that the criteria for a system defined "event" are fulfilled, so called event triggered periodic reporting.

In one embodiment, the method 500 includes that the handover is performed to a second cell in the system which operates on the same frequency as the first cell, and from which second cell the user terminal has measured a signal strength which differs from the signal strength from the first cell by a certain margin for a certain amount of time.

In one embodiment, the method 500 includes that the handover is performed to a second cell in the system which operates on a frequency different from that of the first cell, from which second cell the user terminal has measured a signal strength which differs from the signal strength from the first cell by a certain margin for a certain amount of time.

In one embodiment, the method 500 includes that the handover is performed to a cell in a second cellular system of a different standard than that of the first cell.

In one embodiment, the method 500 includes that the handover is performed to a second cell in the system on which second cell the user terminal has not performed any measurements. The second cell can be on a frequency different from that of the first cell.

In one embodiment, the method 500 includes that the handover is initiated in the case of a non-received transmission if the transmission is not received within a certain interval of the expected time.

In one embodiment, the method 500 includes that the handover is initiated in the case of two or more missing transmissions.

In one embodiment, the method 500 includes that the two or more transmissions need to be consecutive in order for the handover to be initiated.

A method in accordance with the invention can be applied in an eNodeB in an LTE/E-UTRAN system, or in a NodeB in a WCDMA system.

The invention is not limited to the examples of embodiments described above and shown in the drawings, but may be freely varied within the scope of the appended claims.

What is claimed is:

1. A controlling node for a cellular communication system, comprising:
    a transmit unit, a receive unit, a processing unit, a memory unit, and an interface for an antenna, wherein the units and interface enable the controlling node to communicate with and handle control of one or more user terminals in a first cell, the controlling node being arranged to receive, via the antenna interface and the receive unit, certain transmissions from one or more user terminals in the first cell with a defined periodicity; and
    a receipt monitor for one or more user terminals in the first cell, wherein the receipt monitor is arranged to monitor timely receipt of one or more of the certain transmissions from the one or more user terminals at an expected time for the defined periodicity, and to initiate handover of a user terminal from the first cell to another cell if the controlling node does not receive one or more of the certain transmissions at the expected time for the defined periodicity from the user terminal.

2. The controlling node of claim 1, wherein the certain transmissions include one or more of scheduling requests, measurement reports containing measurements on the first cell and/or one or more other cells in the system, buffer status reports, channel quality indicator transmissions, random access requests, and data transmissions.

3. The controlling node of claim 1, wherein the processing unit is arranged to instruct, via the transmit unit and the antenna interface, one or more user terminals regarding the defined periodicity with which the certain transmissions should be transmitted to the controlling node.

4. The controlling node of claim 3, wherein the processing unit uses the transmit unit and the antenna interface to instruct a user terminal to start the transmissions with the defined periodicity after the user terminal has detected and reported to the controlling node that a criterion for a defined system event has been fulfilled.

5. The controlling node of claim 3, wherein the processing unit uses the transmit unit and the antenna interface to instruct a user terminal to start the transmissions with the defined periodicity as long as the user terminal detects that a criterion for a defined system event is fulfilled.

6. The controlling node of claim 1, wherein handover is performed to a second cell in the system, which operates on the same frequency as the first cell, from which second cell the user terminal has measured a signal strength which differs from a signal strength from the first cell by a certain margin for a certain amount of time.

7. The controlling node of claim 1, wherein handover is performed to a second cell in the system, which operates on a different frequency than the first cell, from which second cell the user terminal has measured a signal strength which differs from a signal strength from the first cell by a certain margin for a certain amount of time.

8. The controlling node of claim 1, wherein handover is performed to a cell in a second cellular system of a different standard than that of the first cell.

9. The controlling node of claim 1, wherein handover is performed to a second cell in the system on which second cell the user terminal has not performed any measurements.

10. The controlling node of claim 1, wherein handover is initiated in the case of a non-received measurement report if a transmission is not received within a certain interval of the correct time.

11. The controlling node of claim 1, wherein handover is initiated in the case of a predefined number of missing transmissions, the predefined number being two or more.

12. The controlling node of claim 11, wherein the missing transmissions need to be consecutive in order for the handover to be initiated.

13. The controlling node of claim 1, wherein the controlling node is an eNodeB in a Long Term Evolution system or a NodeB in a wideband code division multiple access system.

14. A method for a controlling node of a cellular communication system, the method comprising:
    letting the controlling node receive certain transmissions from one or more user terminals in a first cell with a defined periodicity;
    monitoring, in the controlling node, whether the controlling node receives the certain transmissions from the one or more user terminals at an expected time for the defined periodicity; and
    initiating handover from the first cell to another cell of a user terminal for which the certain transmissions are not received at the expected time.

15. The method of claim 14, wherein the certain transmissions include one or more of scheduling requests, measurement reports containing measurements on the first cell and/or one or more other cells in the system, buffer status reports, channel quality indicator transmissions, random access requests, and data transmissions.

16. The method of claim 14, further comprising checking if the transmissions have been received at the expected time, and initiating handover if this is not the case.

17. The method of claim 14, further comprising instructing a user terminal regarding the defined periodicity with which the user terminal's certain transmissions should be transmitted.

18. The method of claim 14, further comprising instructing a user terminal to start transmissions with the periodicity after the user terminal has detected and reported to the controlling node that a criterion for a defined system event has been fulfilled.

19. The method of claim 14, further comprising instructing a user terminal to start the transmissions with the periodicity as long as the user terminal detects that a criterion for a defined system event is fulfilled.

20. The method of claim 14, wherein handover is initiated to a second cell in the system which operates on the same frequency as the first cell, and from which second cell the user terminal has measured a signal strength which differs from a signal strength from the first cell by a certain margin for a certain amount of time.

21. The method of claim 14, wherein handover is initiated to a second cell in the system which operates on a different frequency than the first cell, from which second cell the user terminal has measured a signal strength which differs from a signal strength from the first cell by a certain margin for a certain amount of time.

22. The method of claim 14, wherein handover is initiated to a second cell in the system on which second cell the user terminal has not performed any measurements.

23. The method of claim 14, wherein handover is initiated in the case of a non-received transmission if the transmission is not received within a certain interval of the correct time.

24. The method of claim 14, wherein handover is initiated in the case of two or more missing transmissions.

25. The method of claim 24, wherein the two or more transmissions need to be consecutive in order for the handover to be initiated.

26. The method of claim 14, wherein the controlling node is an eNodeB in a Long Term Evolution system or in a NodeB in a wideband code division multiple access system.

* * * * *

UNITED STATES PATENT AND TRADEMARK OFFICE
CERTIFICATE OF CORRECTION

PATENT NO.        : 8,780,866 B2                                Page 1 of 1
APPLICATION NO.   : 12/728887
DATED             : July 15, 2014
INVENTOR(S)       : Müller et al.

It is certified that error appears in the above-identified patent and that said Letters Patent is hereby corrected as shown below:

In the Specification

In Column 3, Line 59, delete "eNodeB 128," and insert -- eNodeB 127, --, therefor.

In Column 3, Line 61, delete "eNodeB 128." and insert -- eNodeB 127. --, therefor.

Signed and Sealed this
Nineteenth Day of May, 2015

Michelle K. Lee
*Director of the United States Patent and Trademark Office*